United States Patent [19]

Biermacher

[11] Patent Number: 4,784,430
[45] Date of Patent: Nov. 15, 1988

[54] CLIP AND WHEEL FLAIR MOLDING ASSEMBLY

[75] Inventor: Richard F. Biermacher, W. Bloomfield, Mich.

[73] Assignee: Chrysler Motors Corporation, Highland Park, Mich.

[21] Appl. No.: 151,043

[22] Filed: Feb. 1, 1988

[51] Int. Cl.$^4$ .............................................. B62D 25/00
[52] U.S. Cl. ............................... 296/198; 280/153 R; 280/153 A; 280/153 B; 24/289; 24/295
[58] Field of Search .................... 296/198; 280/153 A, 280/153 B, 153 R, 154, 152 R, 154.5 R; 24/295, 289

[56] References Cited

U.S. PATENT DOCUMENTS

| | | | |
|---|---|---|---|
| 3,410,045 | 11/1968 | Meyer | 24/295 X |
| 4,169,608 | 10/1979 | Logan | 280/153 R |
| 4,174,850 | 11/1979 | Hart | 280/153 R |
| 4,514,003 | 4/1985 | Gay | 280/153 B X |
| 4,715,648 | 12/1987 | Hensel | 296/198 |

Primary Examiner—Robert B. Reeves
Assistant Examiner—Brian K. Sells
Attorney, Agent, or Firm—Edward P. Barthel

[57] ABSTRACT

A flair molding arrangement for a vehicle wheel opening wherein the molding is formed of plastic with a generally right angled L-shaped section defining inner and outer legs. A plurality of spring metal clips are formed with inner and outer arms oriented at a predetermined interior acute angle. The molding outer leg hidden surface has an inwardly facing channel formed along its free edge for receiving each clip outer arm therein. The molding inner leg hidden surface has a plurality of raised lugs formed therealong adapted to lockingly capture an associated clip inner arm whereby a lug through-bore is aligned with a hole in the clip inner arm. Upon a threaded fastener located in an associated through-bore and clip inner arm hole being threadably tightened in an aligned terminal flange installation hole the clip inner arm free edge is fulcrumed on the flange for rotation of the clip thereabout drawing the clip inner arm into flush contact with the terminal flange while swinging the clip outer arm toward the body panel and in turn carrying the molding outer arm into gap-free contact with the body panel.

5 Claims, 3 Drawing Sheets

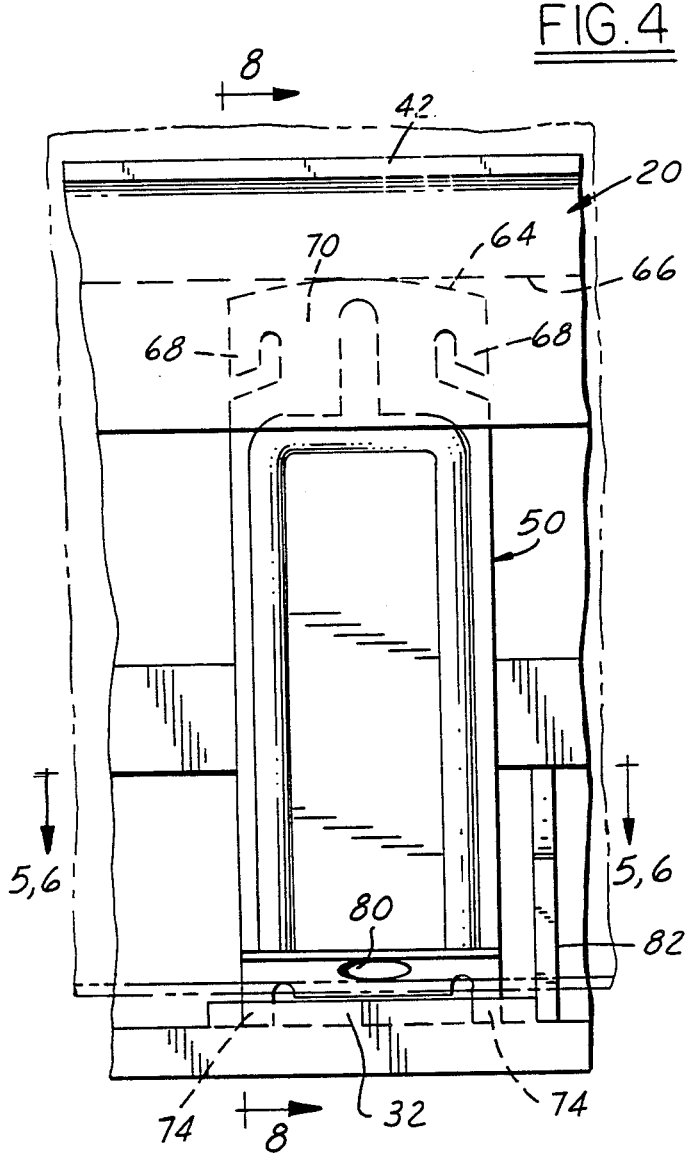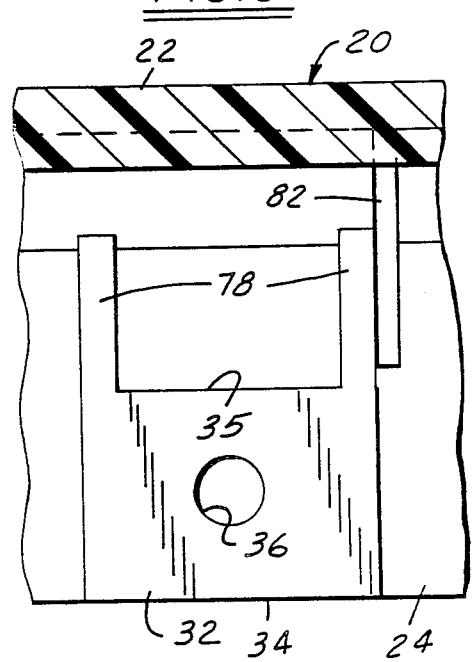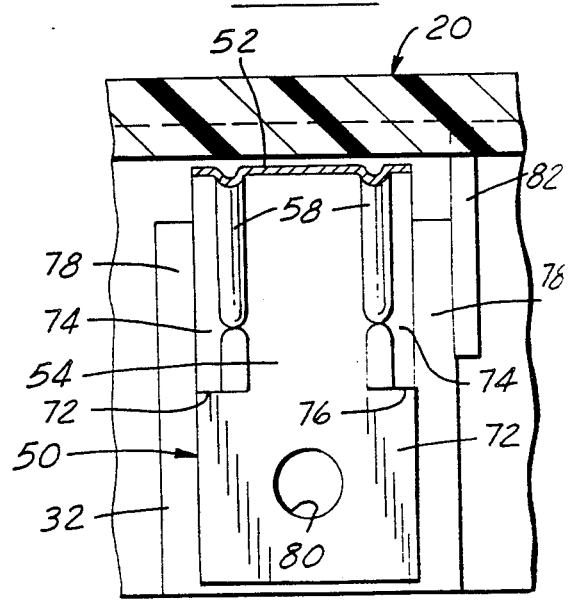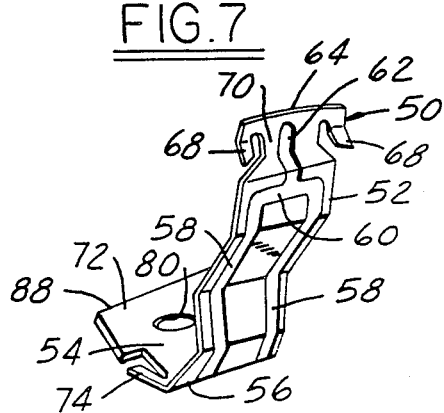

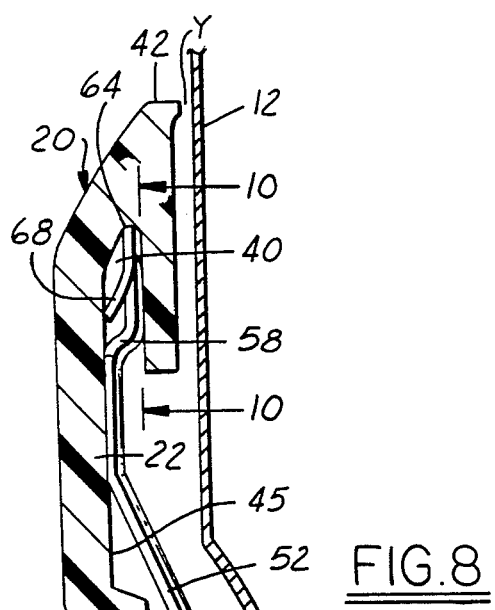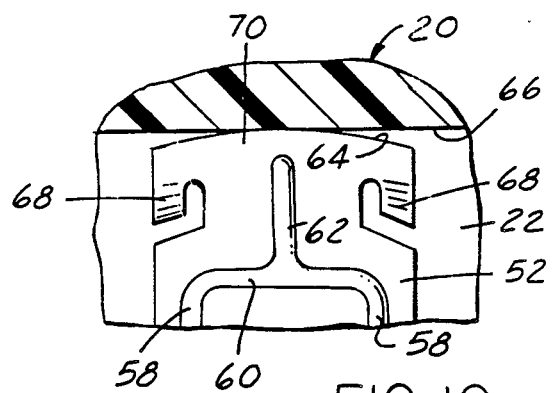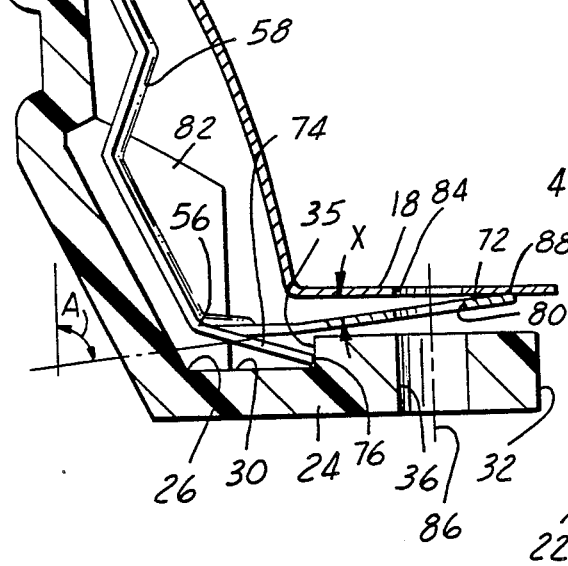

CLIP AND WHEEL FLAIR MOLDING ASSEMBLY

BACKGROUND OF THE INVENTION

This invention relates to a clip and molding assembly for a vehicle body and more particularly to a wheel flair molding assembly for a U-shaped wheel opening providing a ready molding body attachment which obviates gaps between the molding and the body outer panel.

The U.S. Pat. Nos. 4,514,003 issued Apr. 30, 1985 to R. R. Guy and 4,174,850 issued Nov. 20, 1979, to R. K., Hart are representative of prior art arrangements to provide wheel flair molding or trim strips for vehicle body wheel openings. The Guy patent discloses a resilient deformable plastic molding strip that is adhesively secured along an edge of a vehicle body panel. Resilient spring clips are also provided having a cross sectional configuration complementary to that of the molding strip are used with the adhesive layer at areas of high stress concentration to prevent failure of the adhesive bond.

The Hart patent discloses a flair clip apparatus in place of drilling holes through the flair molding and the fender and thereafter inserting bolt and nut combinations, rivets or screws through such holes. The Hart flair clip utilizes a flexible generally truncated triangle-shaped clip one leg of which is provided with a mounting bolt that upon tightening releasably clamps the flare molding to the peripheral portion of the fender.

The U.S. Pat. No. 4,620,745 issued Nov. 4, 1986, to W. G. Jacobs discloses a vehicle body wheel opening structure. In FIG. 1 of the Jacobs patent a prior art structure is shown wherein a molding is positioned around a wheel opening, with the molding including a leg which abuts against a body panel terminal flange and is secured thereto by self-tapping screws.

SUMMARY OF THE INVENTION

It is an object of the present invention to provide terminal flange with each clip adapted for flexing the flair molding exposed free edge into tight contact with the body panel outer surface upon the clip being secured to the terminal flange by its associated fastener, thereby obviating gaps between the molding and the body panel.

It is another object of the present invention to provide a flair molding and fulcrumed clip arrangement as set forth above which permits the molding to be installed in a gap-free manner around fender wheel opening in a minimum amount of time and with a minimum amount of labor.

The flair molding assembly of the present invention includes a plurality of one-piece L-sectioned spring clips adapted for positive retention along the hidden interior of an elongated L-sectioned plastic flair molding with the clips substantially conforming to the angularly related concealed interior leg surfaces of the molding. The L-sectioned molding includes an outer leg adapted to overlie the body outer panel and an inner leg adapted to overlie an inwardly extending body panel terminal flange defining a U-shaped wheel well opening. The terminal flange is provided with a plurality of fastener receiving drilled holes spaced around the wheel opening.

The clip outer arm distal end is received in an open channel formed along the molding outer long leg hidden interior surface. Each clip inner arm is sized to be sandwiched between the body panel terminal flange and the interior opposed surface of the molding inner leg. The clip inner arm has a centered opening adjacent its free end adapted for alignment with an associated drilled hole in the terminal flange and an aligned through-bore in the molding inner leg. The clip inner arm has spring tabs snappingly anchoring its inner arm to a raised lug on the molding inner leg at a predetermined location after its longer outer arm is captured in the molding outer leg channel.

Prior to a threaded fastener being inserted and tightened in the aligned holes and through-bore the clip inner arm defines a predetermined acute angle with the molding inner leg upon the inner arm free edge establishing fulcrum line contact with the opposed face of the terminal flange. Upon the fastener being tightened the clip is pivoted about its inner arm fulcrumed edge until the inner arm is drawn into flush contact with the opposed face of the terminal flange. As a result the clip outer arm pivots about the inner arm fulcrumed edge thereby pulling the associated free end portion of the molding outer leg into tight, gap-free contact with the exposed surface of the vehicle outer panel.

BRIEF DESCRIPTION OF THE DRAWINGS

The foregoing, and other objects and advantages of the present invention will become more apparent from the following detailed description when considered with the accompanying drawings, wherein:

FIG. 4 is an enlarged fragmentary view taken in the direction of arrow 4 shown in FIG. 2;

FIG. 5 is a fragmentary vertical sectional view taken on the line 5—5 of FIG. 4 prior to the installation of the clip;

FIG. 6 is a fragmentary sectional view taken on the line 6—6 of FIG. 4 showing the clip attached to the molding;

FIG. 7 is a perspective view of the L-sectioned clip;

FIG. 8 is an enlarged fragmentary sectional view taken of the line 8—8 of FIG. 4 prior to the insertion of a threaded fastener through the aligned holes in the molding inner leg, the clip inner arm, and body panel terminal flange;

FIG. 9 is a view similar to FIG. 8 after the insertion and tightening of the threaded fastener in the aligned holes; and FIG. 10 is an enlarged vertical cross sectional view taken substantially on the line 10—10 of FIG. 8.

DETAILED DESCRIPTION OF THE INVENTION

Figure 1:
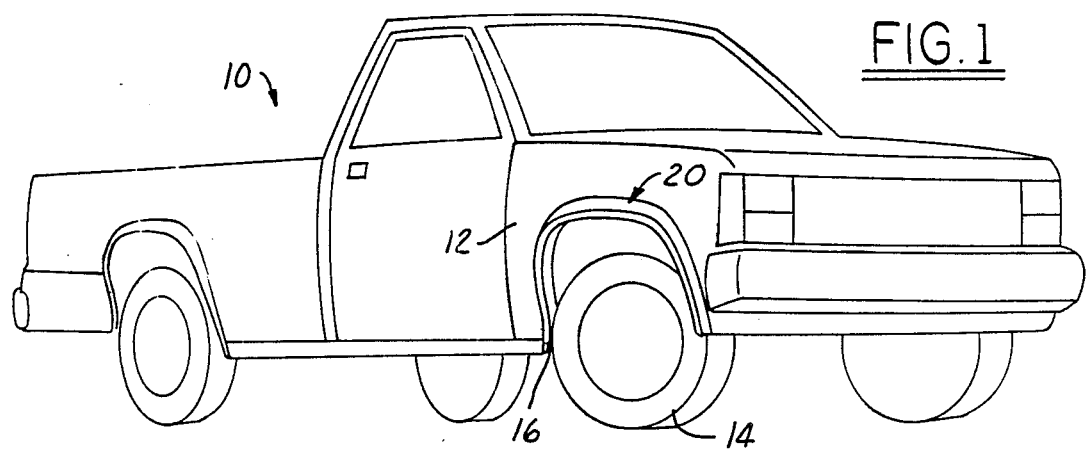
FIG. 1 is a perspective view of a pick-up truck vehicle having body panels adapted for attachment of flair moldings in accordance with the present invention.

Referring now to the drawings there is shown in FIG. 1 a pick-up truck vehicle body 10 having a front quarter body panel member 12 and a front wheel 14 housed within a U-shaped curved wheel opening 16 in the panel. As seen in FIG. 8 the outer body panel 12 includes a laterally inwardly extending terminal flange 18 which defines the front wheel opening 16 of the body 10. A flair molding 20 overlies the panel member 12 around the wheel opening 16 and is formed of a suitable resilient flexible material which in the disclosed embodiment is a synthetic resin or plastic material.

Figure 2:
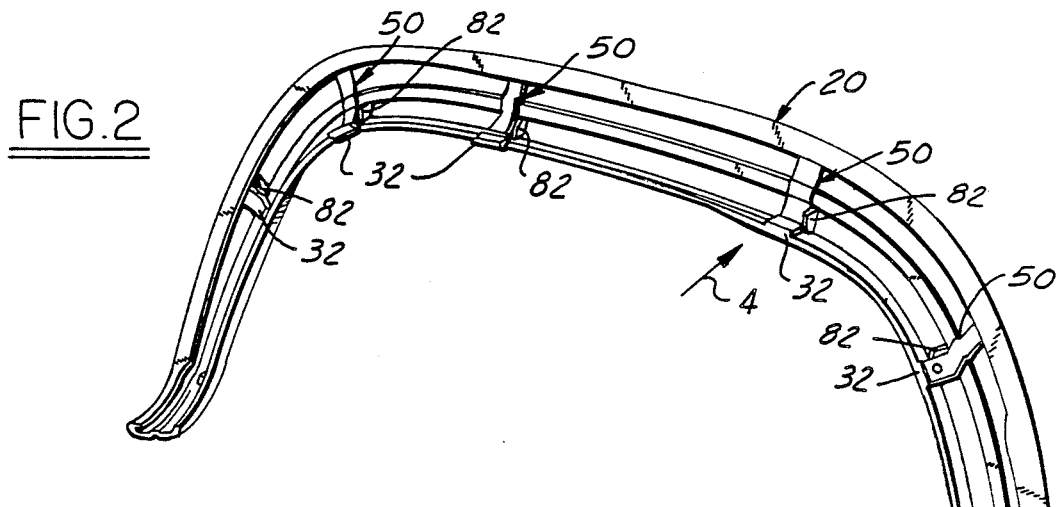
FIG. 2 is a perspective view of the inner surface of a wheel well flair molding and clip assembly adapted for use on the vehicle of FIG. 1.
Figure 3:
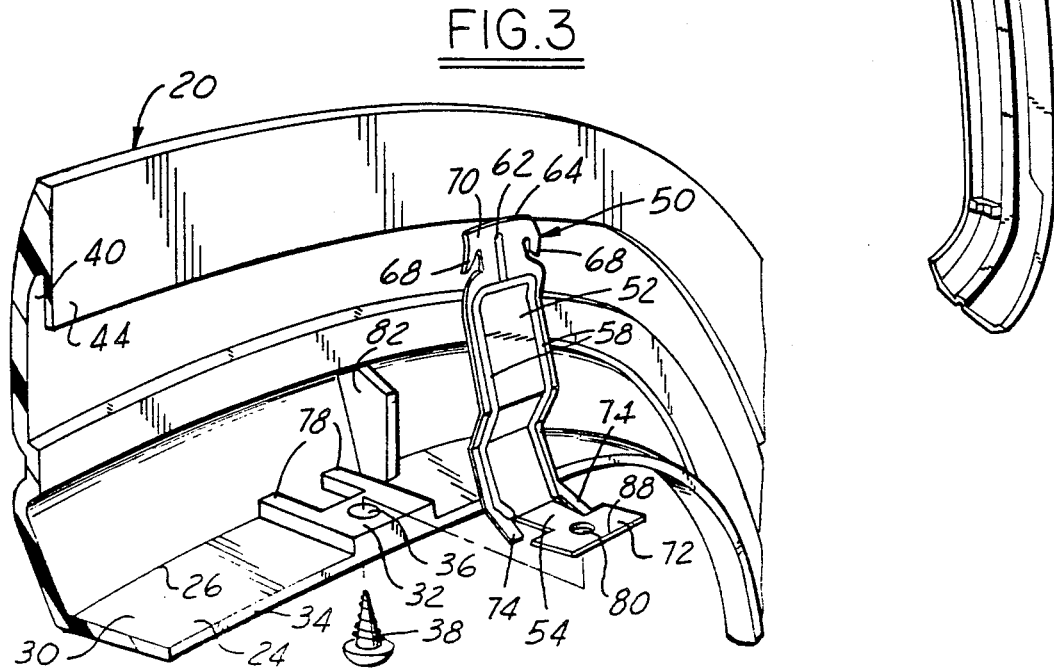
FIG. 3 is an enlarged fragmentary exploded perspective view of the molding and clip assembly of FIG. 2.

As best seen in FIGS. 2 and 3, the angled or generally L-sectioned flair molding 20 comprises an outer long leg 22 and an inner short leg 24 extending at substantially a right angle thereto with the legs integrally joined along juncture 26. The outer leg 22 is adapted to overlie outer surface 28 of the body panel 12 while the inner leg 24 is adapted to overlie the inwardly extending terminal flange 18. It will be noted in FIGS. 3 and 8 that the interior hidden surface 30 of the inner flange 24 has a plurality of spaced rectangular-shaped raised pads or lugs 32 integrally formed in a spaced manner thereon.

Each of the lugs 32 is formed with one inner side flush with free edge 34 of the inner leg 24 and its opposite facing side 35 spaced a predetermined distance from the molding juncture 26. A through-bore 36 is centered in each of the lugs 32 sized to receive a self-tapping threaded screw 38 therethrough. FIGS. 8 and 9 show the molding outer leg 22 formed with an open inwardly facing channel 40 adjacent to and continuous with its free end 42. In the disclosed form the channel 40 is defined in part by an integral flange 44 extending inwardly from the outer leg free end 42 and parallel with the outer leg interior hidden surface 45.

With reference to FIGS. 3, 7 and 8 it will be seen that a plurality of one piece spring metal clips, generally indicated at 50, are provided having a generally L-shaped or right-angled section. Each of the clips 50 comprise a long outer arm 52 and a short inner arm 54 integrally joined at a linear juncture 56. As best seen in FIG. 6 the clip outer arm is formed with parallel stiffener ribs 58 joined by a cross rib 60 and ending in a medial rib portion 62 ending adjacent free arcuate formed edge 64. FIGS. 8 and 10 show the clip outer arm arcuate edge 64 in engagement with molding channel blind end 66 upon being received in the molding outer leg channel 40. It will be noted that the clip outer arm free end is formed with a pair of mirror image barbs or tangs 68 which extend at an angle to the plane of clip free end 70 to for positive gripping engagement within the channel 40.

Again with reference to FIGS. 3, 7 and 8 it will be seen that the clip inner arm 54 is formed with a rectangular pad 72 at its free end sized for conforming reception on an associated lug 32 upon the tightening of a self-tapping screw 38. It will be seen in FIG. 3 that the clip inner arm 54 has a pair of resilient mirror image tangs 74 lanced therefrom and bent downwardly from the plane of arm 54. The tangs 74 are designed such that their free ends 76 snappingly engage their associated lug side 36 after the clip outer arm is received in the open channel 40 so as to positively lock the clip on the molding.

As seen in FIG. 5 each lug 32 is formed with a pair of extensions 78 laterally spaced apart a predetermined distance whereby the extensions capture the clip tangs 74 therebetween. This arrangement assures that central hole 80 in the clip pad 72 is exactly aligned with its associated molding lug through-bore 36. Reinforcement ribs 82 are formed in the molding adjacent one lug extension 78 to provide added stiffness between the molding outer leg 22 and the inner leg 30 adjacent each lug 32.

As seen in FIG. 8 a series of spaced installation holes 84 are provided in the wheel opening terminal flange 18 adapted to receive a threaded fastener 38 upon the fastener being inserted through an aligned through-bore 36 and clip hole 80. It will be noted that with the alignment of through-bore 36 and hole 80 with terminal flange installation hole 84, shown by dashed centerline 86, clip inner arm free edge 88 (FIGS. 3 and 7) contacts the terminal flange at a line contact fulcrum. The clip arms 52 and 54 in their design or unassembled free state define a predetermined included angle "A" of less than 90 degrees. In the disclosed form of the invention the included angle "A" is about 80 degrees. Thus, the clip inner arm 54 defines an angle "X" of about 10 degrees with the terminal flange 18 with its free edge being fulcrumed therewith as seen in FIG. 8.

Upon the threaded fastener 38 being tightened the clip inner arm 54 is drawn into flush contact with the terminal flange 18 by virtue of being sandwiched between the terminal flange 18 and the molding inner leg 24, as seen in FIG. 9. This causes the clip to pivot about its fulcrumed free edge 88 and swing the clip outer arm 52 about the fulcrum toward the body panel 12 and in turn carry or pull the molding outer leg free end 42 into gap-free contact with the surface of the panel 12 so as to close any gaps "y" therebetween.

Although only one embodiment of the invention has been disclosed and described, it is apparent that other embodiments and modifications of the invention are possible.

What is claimed is:

1. A vehicle body structure having an outer panel located in a generally vertically oriented imaginary plane, said panel having an inwardly extending terminal flange adapted to intersect said imaginary vertical plane defining therewith a substantially ninety degree angle, a clip and molding arrangement for said body panel comprising:

a resilient plastic molding formed with a L-section including an outer leg adapted to overlie a portion of the outer surface of said body panel and an inner leg adapted to overlie said terminal flange, said outer and inner legs defining an integral juncture therebetween;

said outer leg having its interior hidden surface formed with an open channel adjacent said outer leg free end so as to face said molding juncture;

a plurality of metal spring clips having a generally L-shaped section forming a first outer arm and a second inner arm defining a predetermined acute included angle therebetween, each said clip first outer arm positioned adjacent the inner surface of said molding outer leg with the free end of said molding outer arm received within said open channel;

each said clip inner arm positioned adjacent the interior hidden surface of said molding inner leg and overlying said terminal flange with its free edge in fulcrumed contact therewith so as to initially define a predetermined acute angle with said terminal flange;

said molding inner leg having a plurality of through-bores spaced therealong, each said through-bore adapted for alignment with a hole in said clip inner arm;

whereby upon a threaded fastener being inserted through one of said molding inner leg through-bores and an aligned hole in said clip inner arm, said fastener threadingly engaging an aligned installation hole in said terminal flange, such that upon said fastener being threadingly tightened in said installation hole said clip inner leg being drawn into flush contact with the opposed face of said terminal flange with said clip outer arm pivoting about said clip inner arm fulcrumed free edge and in turn pulling the clip outer arm associated molding outer leg free end into tight contact with the body panel surface thereby obviating gaps therebetween.

2. The molding and clip arrangement as set forth in claim 1, wherein said molding inner leg formed with a plurality of raised lugs integrally molded thereon having an associated one of said through-bores centered therein, each said clip inner arm positioned on an associated lug such that upon tightening of said one threaded fastener said clip arm is sandwiched between said lug and said terminal flange, said clip inner arm formed with a pair of mirror image tangs engaging an edge of said lug facing said molding juncture, whereby said clip is held in locked engagement with said molding prior to said molding being secured to said body panel terminal flange.

3. The molding and clip arrangement as set forth in claim 1, wherein each said clip inner arm defines a predetermined acute angle of about 10 degrees with its associated molding lug and said clip arms predetermined included angle being about 80 degrees prior to each said molding clip being secured to said body panel terminal flange.

4. The molding and clip arrangement as set forth in claim 2, wherein each said lug formed with a pair of extensions extending laterally toward said juncture and spaced a predetermined distance apart so as to capture its associated clip inner arm tangs therebetween, whereby said clip inner arm hole is aligned width its associated molding inner leg through-bore.

5. The molding and clip arrangement as set forth in claim 3, wherein said clip outer arm formed with a pair of mirror image tangs lockingly engaging molding channel.

* * * * *